United States Patent
Fuju et al.

(10) Patent No.: US 11,836,045 B2
(45) Date of Patent: Dec. 5, 2023

(54) ELECTRONIC CONTROL DEVICE HAVING A NON-VOLATILE MEMORY WITH A RESERVED AREA STORING FAILURE DATA

(71) Applicant: Hitachi Astemo, Ltd., Hitachinaka (JP)

(72) Inventors: Takahito Fuju, Hitachinaka (JP); Kenho Ko, Hitachinaka (JP); Daisuke Teshima, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 107 days.

(21) Appl. No.: 17/418,966

(22) PCT Filed: Feb. 4, 2020

(86) PCT No.: PCT/JP2020/004052
§ 371 (c)(1),
(2) Date: Feb. 15, 2022

(87) PCT Pub. No.: WO2020/162430
PCT Pub. Date: Aug. 13, 2020

(65) Prior Publication Data
US 2022/0197747 A1    Jun. 23, 2022

(30) Foreign Application Priority Data
Feb. 5, 2019 (JP) .................. 2019-018584

(51) Int. Cl.
*G06F 11/07* (2006.01)
*G06F 11/14* (2006.01)
(Continued)

(52) U.S. Cl.
CPC ...... *G06F 11/1433* (2013.01); *G05B 19/0428* (2013.01); *G06F 8/656* (2018.02); *G06F 11/0739* (2013.01); *G06F 11/0787* (2013.01)

(58) Field of Classification Search
CPC ............ G06F 11/0739; G06F 11/0787; G06F 11/1433
See application file for complete search history.

(56) References Cited

U.S. PATENT DOCUMENTS 7,587,431 B1 * 9/2009 Rao ..................... G06F 11/1471
10,152,381 B1 * 12/2018 Shvaiger ............... G06F 3/0631
(Continued)

FOREIGN PATENT DOCUMENTS

JP    2009-44543 A    2/2009
JP    2014-85709 A    5/2014
(Continued)

OTHER PUBLICATIONS

Definition of Arbitrary published by dictionary.com, retrieved Jan. 13, 2023 https://www.dictionary.com/browse/arbitrary (Year: 2023).*
(Continued)

*Primary Examiner* — Joseph O Schell
(74) *Attorney, Agent, or Firm* — Crowell & Moring LLP

(57) ABSTRACT

An electronic control device includes a nonvolatile memory having allocated two storage areas that are exclusively switchable between an active state and an inactive state, the storage area in the active state being used to store a control program to be executed, and the storage area in the inactive state being used as a reserved area for updating the control program. In the electronic control device, when the control program is not updated, arbitrary data is written in the storage area in the inactive state.

10 Claims, 8 Drawing Sheets

(51) Int. Cl.
 *G06F 8/656* (2018.01)
 *G05B 19/042* (2006.01)

(56) References Cited

U.S. PATENT DOCUMENTS

| | | | |
|---|---|---|---|
| 2002/0029313 A1* | 3/2002 | Funakoshi | G11C 16/102 |
| | | | 711/170 |
| 2003/0050747 A1* | 3/2003 | Kamiya | G07C 5/008 |
| | | | 701/33.4 |
| 2005/0132179 A1* | 6/2005 | Glaum | G06F 11/1433 |
| | | | 713/1 |
| 2007/0089033 A1* | 4/2007 | Zeevi | G06F 11/1068 |
| | | | 714/763 |
| 2007/0100513 A1 | 5/2007 | Asano | |
| 2010/0250061 A1* | 9/2010 | Toyofuku | G07C 5/085 |
| | | | 701/33.4 |
| 2011/0172879 A1* | 7/2011 | Abe | G06Q 10/06 |
| | | | 707/821 |
| 2012/0151133 A1* | 6/2012 | Iwasaki | G06F 3/0665 |
| | | | 711/E12.019 |
| 2013/0282961 A1* | 10/2013 | Minamimoto | G06F 11/3476 |
| | | | 711/103 |
| 2017/0046152 A1* | 2/2017 | Shih | G06F 11/0727 |
| 2018/0095681 A1* | 4/2018 | Swanson | G06F 11/1417 |
| 2018/0189049 A1 | 7/2018 | Madrid et al. | |

FOREIGN PATENT DOCUMENTS

| | | |
|---|---|---|
| JP | 2018-86894 A | 6/2018 |
| WO | WO 2005/059862 A1 | 6/2005 |
| WO | WO 2009/090978 A1 | 7/2009 |

OTHER PUBLICATIONS

International Search Report (PCT/ISA/210) issued in PCT Application No. PCT/JP2020/004052 dated Apr. 14, 2020 with English translation (four (4) pages).
Japanese-language Written Opinion (PCT/ISA/237) issued in PCT Application No. PCT/JP2020/004052 dated Apr. 14, 2020 (four (4) pages).
Extended European Search Report issued in European Application No. 20752619.5 dated Aug. 19, 2022 (nine (9) pages).
International Preliminary Report on Patentability (PCT/IB/326, PCT/IB/338 & PCT/IB/373) issued in PCT Application No. PCT/JP2020/004052 dated Aug. 19, 2021, Including English translation of document C2 (Japanese-language Written Opinion (PCT/ISA/237), filed on Jun. 28, 2021) (13 pages).

* cited by examiner

ELECTRONIC CONTROL DEVICE HAVING A NON-VOLATILE MEMORY WITH A RESERVED AREA STORING FAILURE DATA

TECHNICAL FIELD

The present invention relates to an electronic control device and to usage of a nonvolatile memory.

BACKGROUND ART

Electronic control devices mounted on automobiles or other vehicle sometimes have to update their control programs for adding new functions or fixing bugs, for example. Conventionally, vehicle users take their vehicles to a car dealership, for example, for updating such control program of the electronic control device. Since it is inconvenient for them, as disclosed in JP 2018-86894 A (Patent Document 1), proposed is a technique in which the control program is automatically updated at the user site by the "over the air" (OTA) technique using wireless communication.

REFERENCE DOCUMENT LIST

Patent Document

Patent Document 1: JP 2018-86894 A

SUMMARY OF THE INVENTION

Problem to be Solved by the Invention

Upon updating the control program through the OTA, it is desired to successfully update the control program even when a vehicle is running, for example. For this purpose, two storage areas may be allocated in a nonvolatile memory of the electronic control device and they can be alternately used. Specifically, one storage area is used to store a control program to be executed, and the other storage area is used as a reserved area for updating the control program. An update program is written in the reserved area. Then, the program to be executed is switched to the updated one at a timing to reboot the electronic control device, for example. In this way, the control program can be updated even when the vehicle is running, for example. However, the reserved area allocated in the nonvolatile memory is used only for updating the control program, with the result that a storage area available on the nonvolatile memory is reduced.

It is accordingly an object of the present invention to provide an electronic control device capable of efficiently using a nonvolatile memory and usage of the nonvolatile memory.

Means for Solving the Problem

To achieve the object, the present invention provides an electronic control device including a nonvolatile memory having allocated two storage areas that are exclusively switchable between an active state and an inactive state, the storage area in the active state being used to store a control program to be executed, and the storage area in the inactive state being used as a reserved area for updating the control program. In the electronic control device, when the control program is not updated, arbitrary data is written in the storage area in the inactive state.

Effects of the Invention

According to the present invention, the nonvolatile memory of the electronic control device can be efficiently used.

MODE FOR CARRYING OUT THE INVENTION

Referring to the accompanying drawings, embodiments of the present invention will be described in detail below.

Figure 1:
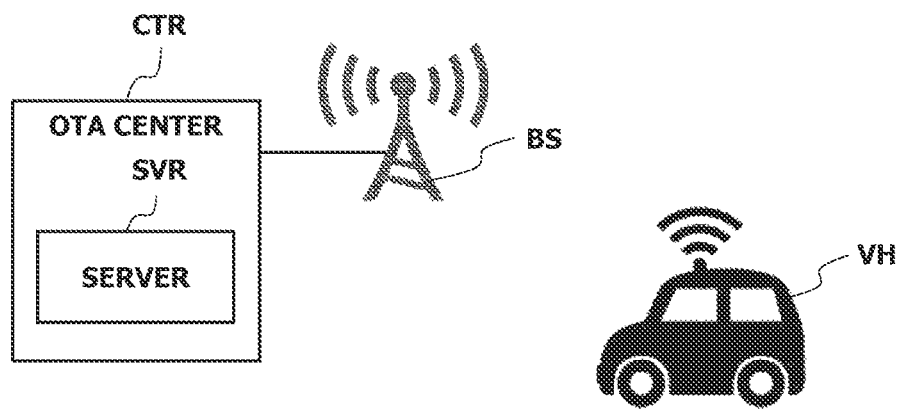
FIG. 1 is a system diagram illustrating how to update a control program of an electronic control device.

FIG. 1 illustrates an example of a system for updating a control program of an electronic control device mounted on a vehicle VH by OTA. An update program is stored in a server SVR of an OTA center CTR, and delivered to vehicle VH through wireless communication from a base station BS connected to OTA center CTR. The update program delivered to vehicle VH is sent to the electronic control device via a wireless transceiver, a gateway, and an in-vehicle network of vehicle VH and written in a nonvolatile memory thereof. Here, server SVR of OTA center CTR is an example of an external device. Server SVR is configured by a general-purpose computer system, for example.

Figure 2:
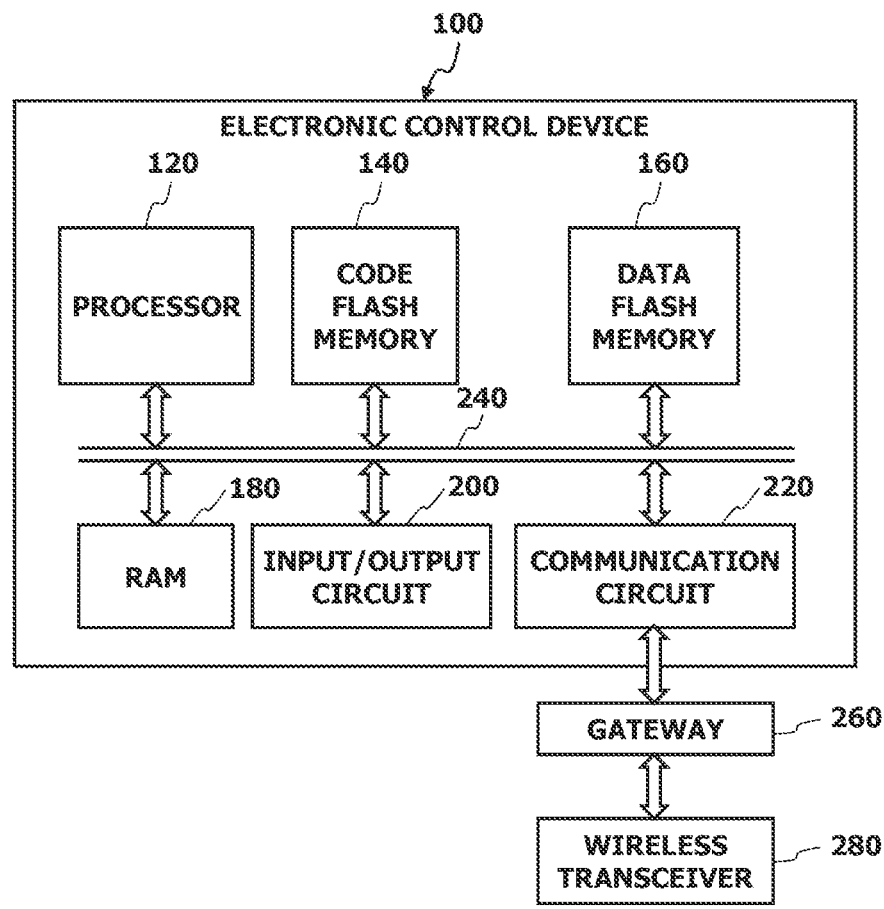
FIG. 2 is an internal configuration diagram illustrating an example of the electronic control device.

FIG. 2 illustrates an example of electronic control device 100 mounted on vehicle VH.

Electronic control device 100 includes a processor 120, a code flash memory 140, a data flash memory 160, a random access memory (RAM) 180, an input/output circuit 200, a communication circuit 220, and an internal bus 240 for connecting these components in a mutually communicable manner. Here, code flash memory 140 is an example of a nonvolatile memory. FIG. 2 illustrates only one electronic control device 100, but vehicle VH may have a plurality of electronic control devices 100 connected to a controller area network (CAN) or other in-vehicle network.

Processor 120 is hardware for executing an instruction set (e.g., data transfer, computation, processing, control, and management) described in a program. The processor 120 includes a computing unit, a register for storing instructions and information, and a peripheral circuit, for example. Code flash memory 140 includes an electrically rewritable nonvolatile memory, and stores control programs for controlling the engine, an automatic transmission, and a fuel injector, for example. Data flash memory 160 includes an electrically rewritable nonvolatile memory. The data flash memory 160 stores learning values or other data, for example. RAM 180 includes a volatile memory in which data is erased when the power supply is interrupted. The RAM 180 provides a temporal storage area for processor 120.

Input/output circuit 200 includes, for example, an A/D converter, a D/A converter, and a D/D converter, and provides a function of inputting and outputting an analog signal and a digital signal to and from the external device. Communication circuit 220 includes a CAN transceiver, for example, and provides a function of connecting to the in-vehicle network. Internal bus 240 is a path for exchanging data between devices. The internal bus 240 includes an address bus for transferring an address, a data bus for transferring data, and a control bus for exchanging information about the actual timing to input or output data via the address bus or data bus, and control information therefor.

Communication circuit 220 of electronic control device 100 is connected via a gateway 260 to wireless transceiver 280 that communicates wirelessly with a base station BS. In this example, gateway 260 provides a function of converting the protocol of data transmitted from base station BS into the protocol that can be processed by communication circuit 220, and also a function of converting the protocol of data processed in electronic control device 100 into the protocol that can be processed by base station BS.

With the above configuration, wireless transceiver 280 mounted on vehicle VH receives the update program delivered from base station BS, and then, the update program is transmitted to processor 120 via communication circuit 220 and internal bus 240 while being converted in protocol by gateway 260. After that, processor 120 updates a control program in code flash memory 140 according to a program prestored in code flash memory 140, for example, as detailed below. Here, the program prestored in code flash memory 140 can be also updated.

Figure 3:
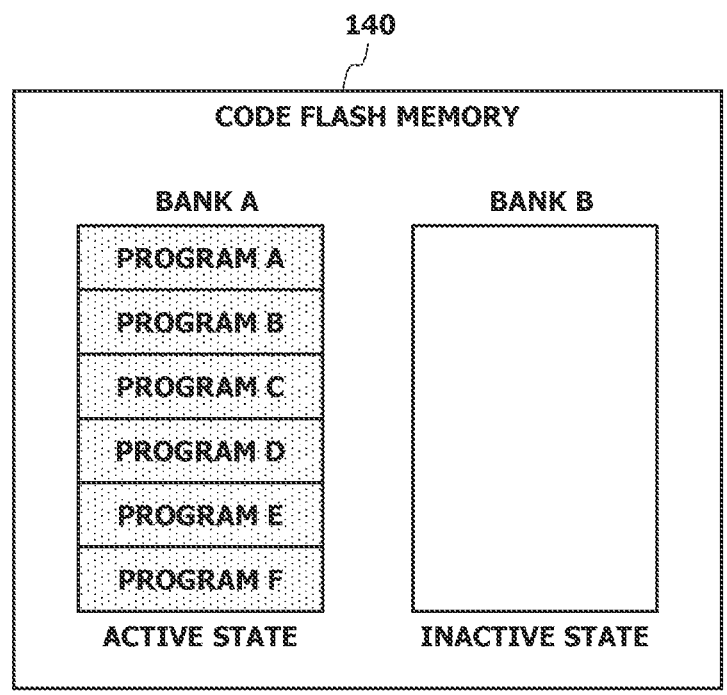
FIG. 3 illustrates the data structure of a code flash memory.

As illustrated in FIG. 3, a bank A and a bank B are allocated in code flash memory 140 as an example of two storage areas exclusively switchable between an active state and an inactive state. In the illustrated example of FIG. 3, control programs A to F for controlling target components of electronic control device 100 are written in the bank A in an active state, and no data is written in the bank B in an inactive state. In this example, the bank B in the inactive state is used as a reserved area for updating control programs A to F. The bank in the active state and the bank in the inactive state will be hereinafter referred to as "active ROM" and "inactive ROM", respectively.

Figure 4:
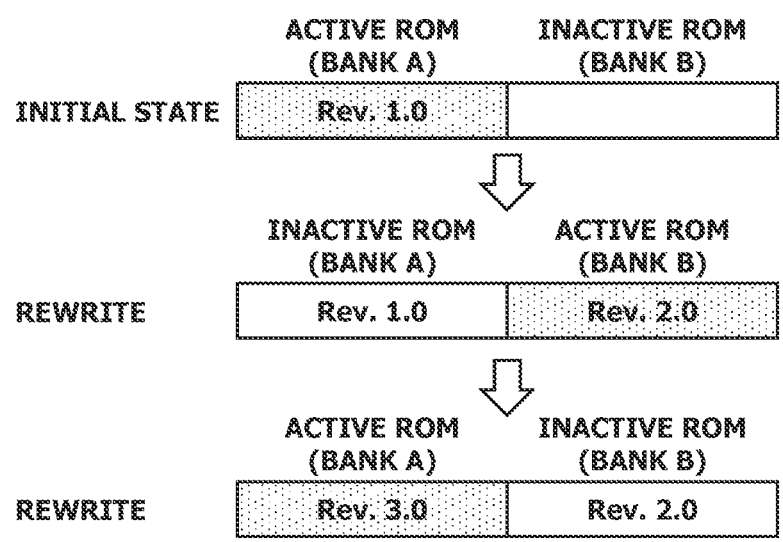
FIG. 4 is an exemplary diagram on how to update a control program.

In an initial state of electronic control device 100, as illustrated in FIG. 4, a control program of Rev. 1.0 is written in the active ROM, and the inactive ROM is unused. In this initial state, when updating the control program written in the active ROM, an update program of Rev. 2.0 is written in the inactive ROM. Then, the active ROM is switched to the inactive ROM and also the inactive ROM is switched to the active ROM at a predetermined timing, for example, at reboot time of electronic control device 100. Accordingly, electronic control device 100 can execute afterward the control program of Rev. 2.0 written in the active ROM, to thereby perform such control that a function is added or a bug is fixed, for example.

When further updating the control program of Rev. 2.0 written in the active ROM, an update program of Rev. 3.0 is written in the inactive ROM, and the active ROM is switched to the inactive ROM and also the inactive ROM is switched to the active ROM at a predetermined timing, for example, at reboot time of electronic control device 100. In this way, the control program can be updated even when vehicle VH is running.

However, if the inactive ROM is used only for updating the control program, a storage area available on code flash memory 140 is reduced. To address this, if the control program is not updated, processor 120 of electronic control device 100 writes any data to the inactive ROM in order to efficiently use code flash memory 140. In this example, any data can be failure information of at least one of "on board snapshot (OBS)" and "freeze frame data (FFD)", for example.

Figure 5:
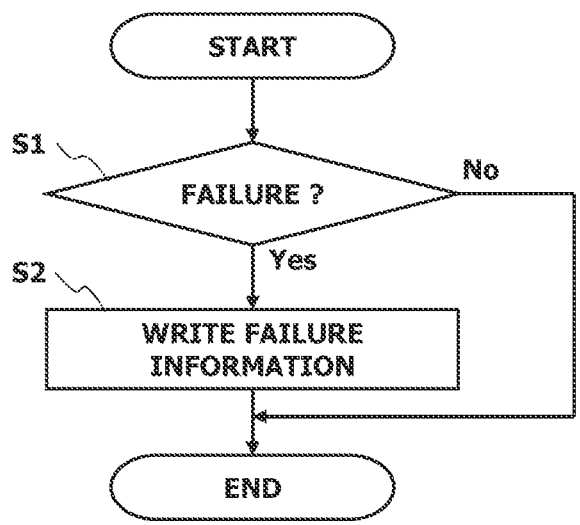
FIG. 5 is a flowchart of an example of failure information write processing executed at a vehicle.

FIG. 5 illustrates an example of failure information write processing which is repeatedly executed by processor 120 of electronic control device 100 at every predetermined time following boot-up of electronic control device 100. In this example, processor 120 of electronic control device 100 executes the failure information write processing according to a program written in code flash memory 140.

In Step 1 (in FIG. 5, abbreviated as "S1"; the same applies below), processor 120 of electronic control device 100 determines whether a failure occurs in a component to be controlled, a sensor, and other components of electronic control device 100. The failure determination is possible by using, for example, self diagnosis function, or built-in self test (BIST). Then, if it is determined that a failure has occurred (Yes), processor 120 of electronic control device 100 advances the processing to Step 2. If it is determined that no failure has occurred (No), processor 120 of electronic control device 100 ends the failure information write processing.

Figure 6:
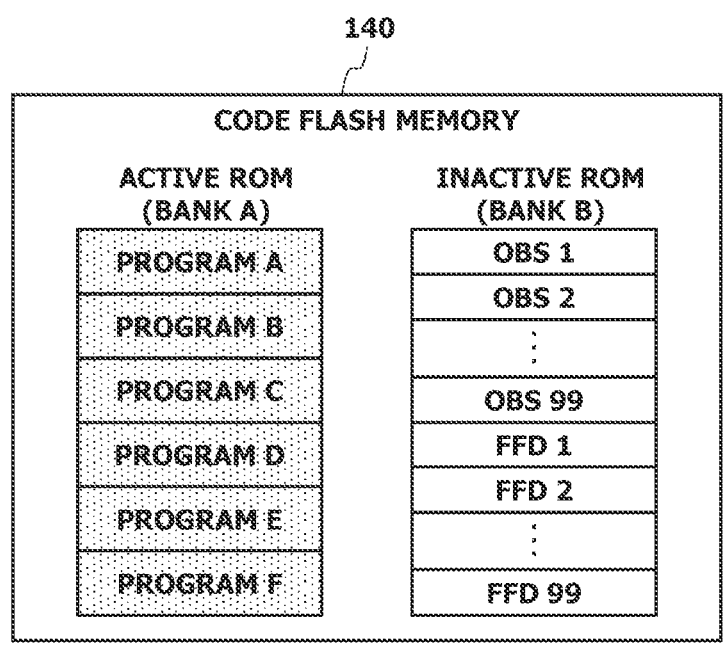
FIG. 6 illustrates a state in which failure information is written in a storage area in an inactive state.

In Step 2, as illustrated in FIG. 6, processor 120 of electronic control device 100 writes failure information in the inactive ROM. In the illustrated example of FIG. 6, processor 120 of electronic control device 100 writes OBSs 1 to 99 and FFDs 1 to 99 as the failure information in the inactive ROM, but the type and number of failure information can be freely set. In addition, the failure information can be written in the inactive ROM, for example, in time series.

With the above settings, if the inactive ROM is not used for updating a control program, a storage area of the inactive ROM is used for storing the failure information. Accordingly, code flash memory 140 can be efficiently used. Moreover, as the failure information is written in the inactive ROM of code flash memory 140, the capacity of a backup RAM can be smaller than the conventional technique that writes failure information in the backup RAM. This saves the cost of electronic control device 100. Under the current regulation, loss of the failure information at the time of updating the control program is not considered a problem, and this shall not prevent the use of the inactive ROM for updating the control program. The failure information written in the inactive ROM of code flash memory 140 is read by, for example, generic scan tool (GST), and the thus-read information can be used to identify the cause of a failure.

Figure 7:
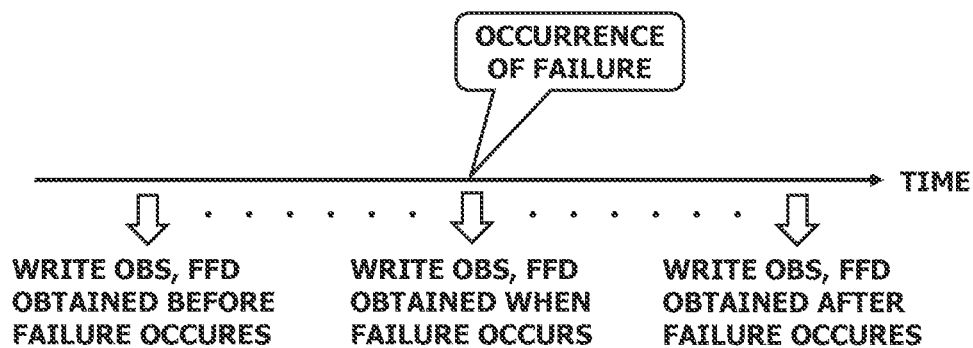
FIG. 7 is an exemplary diagram on how to write failure information obtained when a failure occurs and failure information obtained before and after the failure occurs.

Code flash memory 140 has relatively large capacity. Thus, as illustrated in FIG. 7, it is possible to write in the inactive ROM at least one OBS and FFD obtained before a failure occurs and at least one OBS and FFD obtained after the failure occurs as well as at least one OBS and FFD obtained when the failure occurs. In this case, it is necessary to temporarily store in RAM 180 in time series the OBS and FFD obtained before the failure occurs. Thus, the numbers of OBSs and FFDs may be set according to the capacity of RAM 180, for example. In addition, it is possible to determine how many OBSs and FFDs are to be obtained after the failure occurs, as appropriate in consideration of the capacity of the inactive ROM, for example. With the above settings, the failure information can be obtained for longer time and more frequently, to thereby be able to understand the details about how the failure occurs and the behavior after the failure occurs. This is useful for analyzing the cause of the failure.

Figure 8:
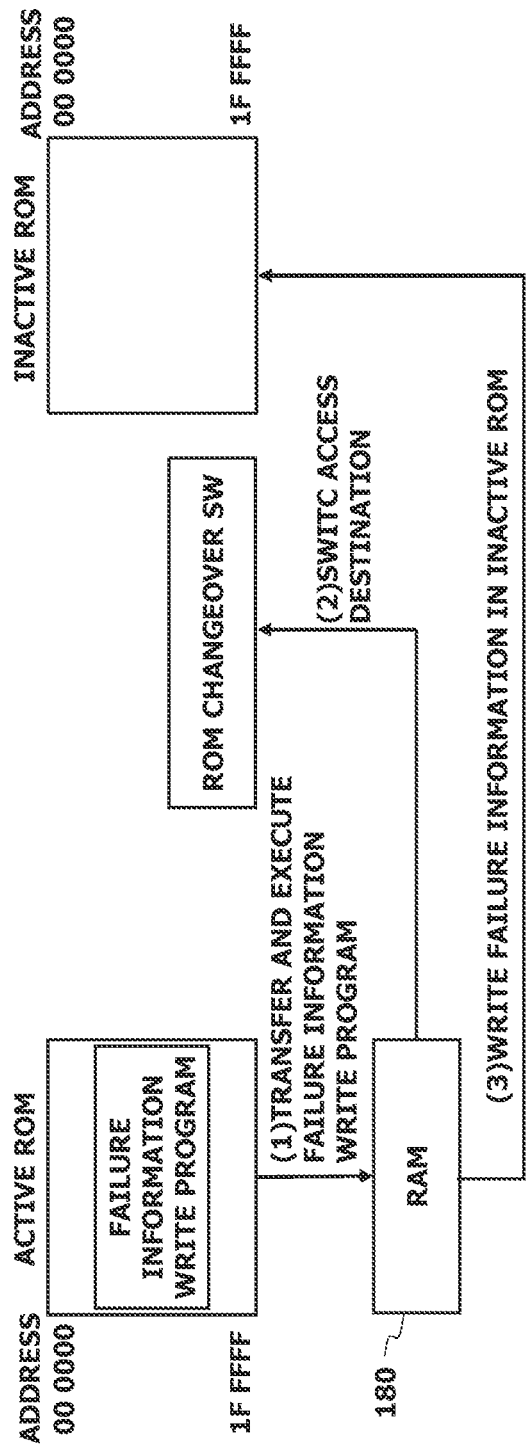
FIG. 8 is an exemplary diagram on how to write failure information in storage areas having the same address space.

If the active ROM and the inactive ROM have the same address space, failure information cannot be written in the inactive ROM using the failure information write program written in the active ROM. In this case, as illustrated in FIG. 8, processor 120 of electronic control device 100 transfers the failure information write program written in the active ROM to RAM 180, and executes the program (Procedure 1). The failure information write program executed on RAM 180 controls a ROM changeover switch for exclusively switching the active ROM and the inactive ROM, thereby allowing access to the inactive ROM (Procedure 2), and then writes the failure information in the inactive ROM (Procedure 3). Here, after the failure information write program has completely written the failure information in the inactive ROM, the failure information write program controls the ROM changeover switch to allow access to the active ROM.

After the control program is updated using the inactive ROM of code flash memory 140, the failure information written in the inactive ROM can be continuously retained if necessary, as described below.

Figure 9:
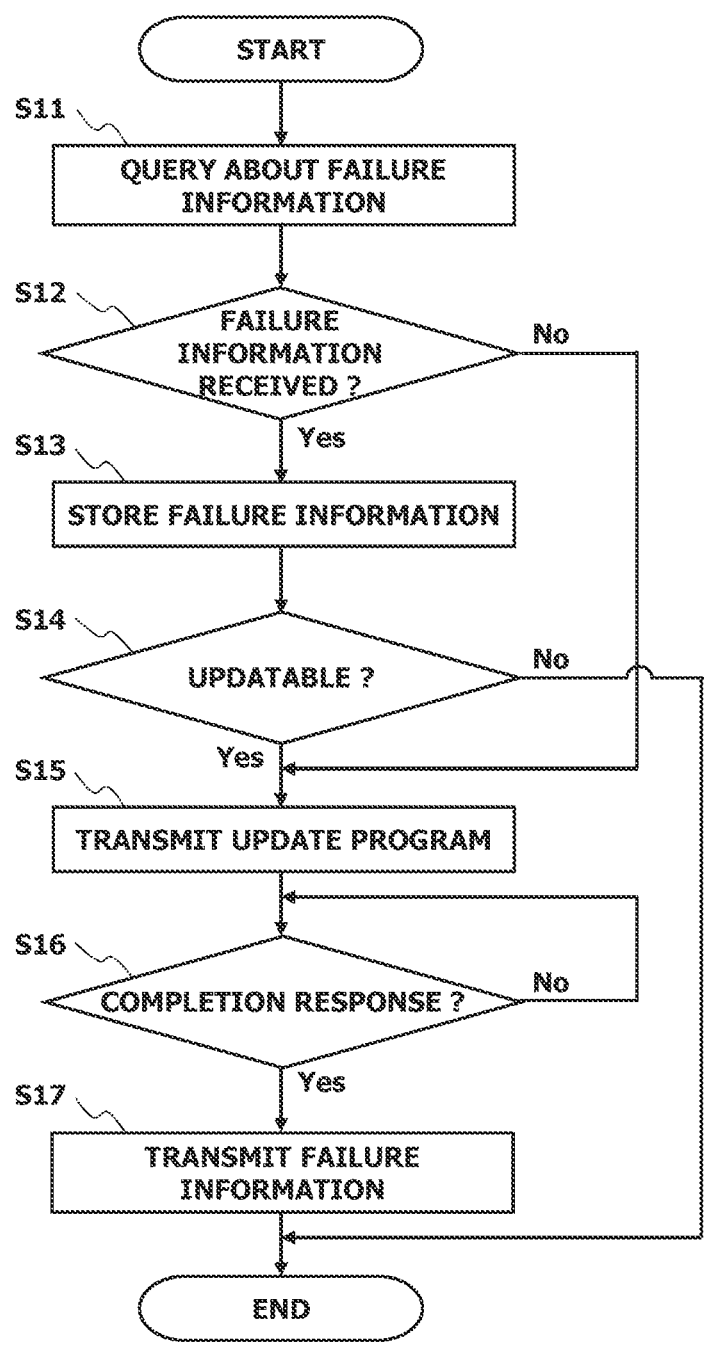
FIG. 9 is a flowchart of an example of program update processing executed at an OTA center.

FIG. 9 illustrates an example of program update processing which is executed by server SVR in response to, for example, an administrator's instruction to update the control program at OTA center CTR. Server SVR of OTA center CTR executes the program update processing according to a program stored in a hard disk drive or other storage, for example.

In Step 11, server SVR of OTA center CTR sends to vehicle VH a query about failure information. Here, the query about failure information is sent to every vehicle VH having a control program to be updated, for example.

In Step 12, server SVR of OTA center CTR determines whether the failure information has been received from vehicle VH. Then, if it is determined that the failure information has been received (Yes), server SVR of OTA center CTR advances the processing to Step 13. If it is determined that the failure information has not been received, that is, no failure information has been written in the inactive ROM of vehicle VH (No), server SVR of OTA center CTR advances the processing to Step 15.

In Step 13, server SVR of OTA center CTR temporarily stores the failure information received from vehicle VH in, for example, the hard disk or other storage in association with an identifier of each vehicle VH. Here, server SVR of OTA center CTR may store the failure information on a cloud server.

Figure 10:
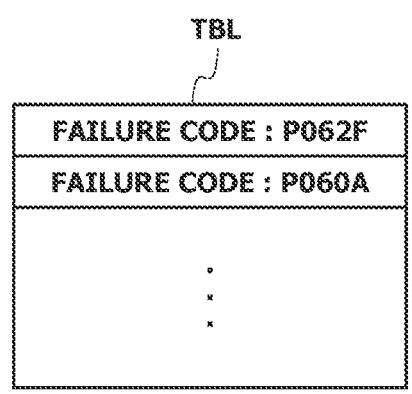
FIG. 10 illustrates a table that defines each failure for which a control program cannot be updated.

In Step 14, server SVR of OTA center CTR refers to the received failure information to determine whether the control program can be updated. That is, as illustrated in FIG. 10, server SVR of OTA center CTR has a table TBL that stores at least one failure code included in the failure information, in relation to a failure of vehicle VH whose control program may not be successfully updated. Then, server SVR of OTA center CTR confirms whether the failure code included in the received failure information is stored in table TBL, to thereby determine whether the control program can be updated. If it is determined that the control program can be updated (Yes), server SVR of OTA center CTR advances the processing to Step 15. If it is determined that the control program cannot be updated (No), server SVR of OTA center CTR ends the program update processing.

In Step 15, server SVR of OTA center CTR transmits an update program to vehicle VH. Here, if the update program is too large to be transmitted through one communication, server SVR of OTA center CTR can divide the update program into a predetermined size that is transmittable through one communication, and then sequentially transmit each divided update program. Here, server SVR of OTA center CTR may transmit a difference of the control program stored in the active ROM instead of transmitting the entire update program.

In Step 16, server SVR of OTA center CTR determines whether vehicle VH has sent a completion response indicating the completion of updating the control program. If it is determined that vehicle VH has sent the completion response (Yes), server SVR of OTA center CTR advances the processing to Step 17. If it is determined that vehicle VH has not sent the completion response (No), server SVR of OTA center CTR waits for the completion response.

In Step 17, server SVR of OTA center CTR transmits to vehicle VH the failure information temporarily stored in the storage. That is, as the control program has been completely updated at vehicle VH, server SVR of OTA center CTR transmits failure information to vehicle VH. Thus, the failure information in vehicle VH can be continuously used. Here, if no failure information has been written in the inactive ROM of vehicle VH to which to transmit the failure information, server SVR of OTA center CTR may notify vehicle VH that no failure information has been written, instead of transmitting the failure information.

In transmitting failure information to vehicle VH, server SVR of OTA center CTR can also add revision information of each control program to the failure information so as to successfully identify the revision of a control program associated with the failure information. With these settings, if there is other failure information associated with a control program of a different revision, target failure information can be linked to a corresponding control program by reference to revision information thereof.

Figure 11:
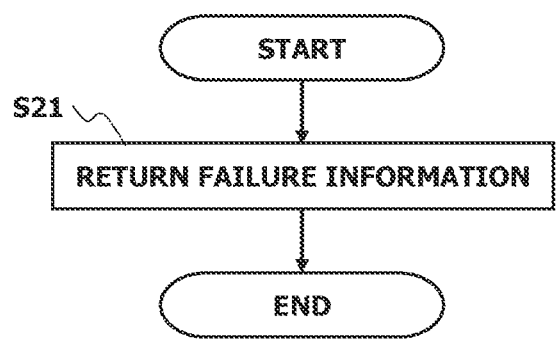
FIG. 11 is a flowchart of an example of failure information return processing executed at the vehicle.

FIG. 11 illustrates an example of failure information return processing which is executed by processor 120 of electronic control device 100 when electronic control device 100 of vehicle VH receives a query about failure information. Here, processor 120 of electronic control device 100 executes the failure information return processing according to the program stored in code flash memory 140.

In Step 21, processor 120 of electronic control device 100 returns to OTA center CTR that has queried about failure information, failure information written in the inactive ROM of code flash memory 140. Here, if no failure information has been written in the inactive ROM, processor 120 of electronic control device 100 returns a message to that effect as the failure information.

Figure 12:
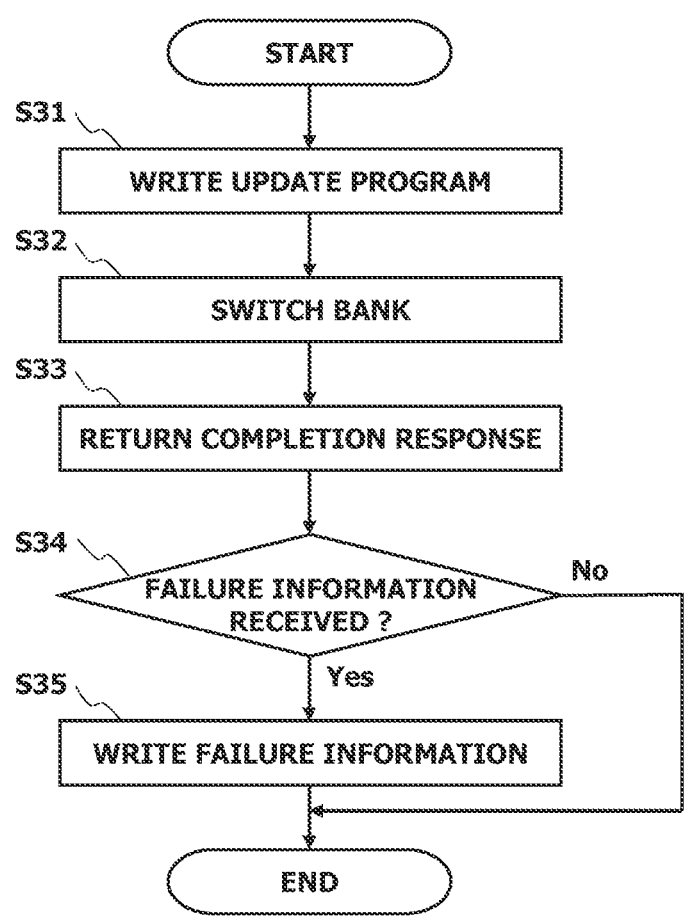
FIG. 12 is a flowchart of an example of program update processing executed at the vehicle.

FIG. 12 illustrates an example of program update processing which is executed by processor 120 of electronic control device 100 when electronic control device 100 of vehicle VH receives the update program. Here, processor 120 of electronic control device 100 executes the program update processing according to the program stored in code flash memory 140.

In Step 31, processor 120 of electronic control device 100 writes the received update program in the inactive ROM. In this example, if receiving a difference of the control program stored in the active ROM, processor 120 of electronic control device 100 can apply the patch to the control program stored in the active ROM and also write it in the inactive ROM.

In Step 32, processor 120 of electronic control device 100 switches the active ROM to the inactive ROM and also the inactive ROM to the active ROM at a predetermined timing. In this example, the predetermined timing can be set to such a timing that no trouble occurs even if control becomes impossible or insufficient during switching, for example, when electronic control device 100 reboots, when idling of the engine is stopped, and when the vehicle is parked. Thus, electronic control device 100 can subsequently control a target component based on the updated control program.

In Step 33, processor 120 of electronic control device 100 returns, to OTA center CTR having transmitted the update program, a completion response indicating the completion of updating the control program. Here, if the update program has not been successfully written in the inactive ROM, processor 120 of electronic control device 100 may transmit a request to retransmit the update program instead of the completion response. In this case, server SVR of OTA center CTR may retransmit the update program in response to the retransmission request.

In Step 34, processor 120 of electronic control device 100 determines whether failure information has been received from OTA center CTR. Then, if it is determined that failure information has been received (Yes), processor 120 of electronic control device 100 advances the processing to Step 35. If it is determined that the failure information has not been received, that is, no failure information has been written (No), processor 120 of electronic control device 100 ends the program update processing.

In Step 35, processor 120 of electronic control device 100 writes the failure information in the inactive ROM.

With these settings, in updating the control program of electronic control device 100, OTA center CTR first sends a query about failure information to vehicle VH. Electronic control device 100 of vehicle VH having received the query about failure information returns to OTA center CTR the failure information written in the inactive ROM or a message that no failure information has been written. If receiving the failure information, OTA center CTR temporarily stores the failure information in a storage and also determines whether the control program can be updated based on a failure identified by the failure information. Then, if the control program can be updated or no failure information has been written, OTA center CTR transmits an update program to electronic control device 100 of vehicle VH.

Electronic control device 100 of vehicle VH having received the update program writes the update program in the inactive ROM, and at a predetermined timing, switches the active ROM to the inactive ROM and also the inactive ROM to the active ROM. Then, electronic control device 100 of vehicle VH returns to OTA center CTR a completion response indicating the completion of updating the control program. After that, when receiving the failure information from OTA center CTR, electronic control device 100 of vehicle VH writes the failure information in the inactive ROM.

In short, upon updating the control program, electronic control device 100 of vehicle VH transmits failure information written in the inactive ROM to OTA center CTR, and writes the update program transmitted from OTA center CTR in the inactive ROM. Moreover, electronic control device 100 of vehicle VH switches the active ROM to the inactive ROM and also the inactive ROM to the active ROM, and writes the failure information transmitted from OTA center CTR in the inactive ROM.

Thus, electronic control device 100 of vehicle VH alternately uses two storage areas allocated in code flash memory 140 to update the control program as well as ensure continuous use of the failure information written in the inactive ROM.

In the foregoing embodiments, two storage areas are allocated in code flash memory 140, but may be allocated in data flash memory 160 or physically one nonvolatile memory. Moreover, the inactive ROM may store learning values or other data in place of, or in addition to, the failure information.

Note that those skilled in the art will readily appreciate that various technical ideas of the above embodiments can be omitted, appropriately combined, or replaced in part to make another embodiment.

REFERENCE SYMBOL LIST

100 Electronic control device
120 Processor
140 Code flash memory (nonvolatile memory)
VH Vehicle
CTR OTA center
SVR Server (external device)

The invention claimed is:

1. An electronic control device comprising:
a nonvolatile memory having allocated two storage areas that are exclusively switchable between an active state and an inactive state, wherein one of the two storage areas is in the active state and is used to store a control program to be executed, and a second of the two storage areas is in the inactive state and is used as a reserved area for updating the control program, wherein
when the control program is not updated, failure data is written in the storage area in the inactive state, and
when the control program is updated, the failure data written in the storage area in the inactive state is transmitted to an external device, an update program transmitted from the external device is written in the storage area in the inactive state, the storage area in the active state is switched to the inactive state and the storage area in the inactive state is switched to the active state, and the failure data transmitted to the external device is written in the storage area in the inactive state.

2. The electronic control device according to claim 1, wherein the failure data is at least one of OBS and FFD.

3. The electronic control device according to claim 1, wherein the failure data is written in time series.

4. The electronic control device according to claim 1, wherein failure data is obtained before and after the failure occurs, and the failure data is written.

5. The electronic control device according to claim 1, wherein the external device is a server of an OTA center.

6. A method for managing data of a nonvolatile memory in an electronic control device comprising:
providing a nonvolatile memory having allocated two storage areas that are exclusively switchable between an active state and an inactive state, wherein one of the two storage areas is in the active state and is used to store a control program to be executed, and a second of the two storage areas is in the inactive state and is used as a reserved area for updating the control program, writing, when a control program is not updated, using a processor of the electronic control device, failure data to the storage area in the inactive state;

transmitting, when the control program is updated, using the processor of the electronic control device, the failure data written in the storage area in the inactive state to an external device;

writing an update program transmitted from the external device to the storage area in the inactive state;

switching the storage area in the active state to the inactive state and also switching the storage area in the inactive state to the active state; and writing the failure data transmitted to the external device in the storage area in the inactive state.

7. The method for managing data of a nonvolatile memory according to claim 6, wherein the failure data is at least one of OBS and FFD.

8. The method for managing data of a nonvolatile memory according to claim 6, wherein the processor of the electronic control device writes the failure data in the storage area in the inactive state in time series.

9. The method for managing data of a nonvolatile memory according to claim 6, wherein the processor of the electronic control device writes, in the storage area in the inactive state, failure data which is obtained when a failure occurs and failure data which is obtained before and after the failure occurs.

10. The method for managing data of a nonvolatile memory according to claim 6, wherein the external device is a server of an OTA center.

\* \* \* \* \*